United States Patent
Abraham et al.

(10) Patent No.: US 9,436,608 B1
(45) Date of Patent: Sep. 6, 2016

(54) MEMORY NEST EFFICIENCY WITH CACHE DEMAND GENERATION

(71) Applicant: International Business Machines Corporation, Armonk, NY (US)

(72) Inventors: Ansu A. Abraham, Danbury, CT (US); Daniel V. Rosa, Highland, NY (US); Donald W. Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 14/620,240

(22) Filed: Feb. 12, 2015

(51) Int. Cl.
*G06F 12/08* (2016.01)

(52) U.S. Cl.
CPC ....... *G06F 12/0842* (2013.01); *G06F 12/0868* (2013.01); *G06F 2212/603* (2013.01)

(58) Field of Classification Search
CPC ........... G06F 12/0842; G06F 12/0868; G06F 2212/603
See application file for complete search history.

(56) References Cited

U.S. PATENT DOCUMENTS

| | | | |
|---|---|---|---|
| 6,650,451 B1 * | 11/2003 | Byers | H04B 10/1125 398/129 |
| 8,738,862 B2 | 5/2014 | Heller, Jr. | |
| 2006/0101470 A1 * | 5/2006 | Swanberg | G06F 9/5077 718/105 |
| 2011/0161126 A1 * | 6/2011 | Best | G06Q 10/06 705/7.13 |
| 2012/0079491 A1 * | 3/2012 | Chung | G06F 9/5011 718/103 |
| 2012/0198159 A1 | 8/2012 | Fujikawa et al. | |
| 2014/0068170 A1 | 3/2014 | Anderson | |
| 2014/0229683 A1 | 8/2014 | Hiniker-Roosa | |
| 2014/0351552 A1 | 11/2014 | Iyigun et al. | |
| 2015/0026694 A1 * | 1/2015 | Akiyama | G06F 12/0261 718/103 |

FOREIGN PATENT DOCUMENTS

JP     5240220     9/1993

OTHER PUBLICATIONS

Caulfield et al., "Gordon: Using Flash Memory to Build Fast, Power-efficient Clusters for Data-intensive Applications", ASPLOS '09, Mar. 7-11, 2009, pp. 217-228.
Jang et al., "Exploiting Memory Access Patterns to Improve Memory Performance in Data-Parallel Architectures", IEEE Transactions on Parallel and Distributed Systems, vol. 22, No. 1, Jan. 2011, pp. 105-118.
Jia et al., "Characterizing and Improving the Use of Demand-Fetched Caches in GPUs" ICS'12, Jun. 25-29, 2012, San Servolo Island, Venice, Italy, pp. 15-24.
List of IBM Patents or Patent Applications Treated as Related—Date Filed: Sep. 11, 2015; 2 pages.
U.S. Appl. No. 14/851,002, filed Sep. 11, 2015; Entitled: "Improving Memory Nest Efficiency with Cache Demand Generation".

* cited by examiner

*Primary Examiner* — Hiep Nguyen
(74) *Attorney, Agent, or Firm* — Cantor Colburn LLP; William A. Kinnaman, Jr.

(57) ABSTRACT

Embodiments of the disclosure relate to optimizing a memory nest for a workload. Aspects include an operating system determining the cache/memory footprint of each work unit of the workload and assigning a time slice to each work unit of the workload based on the cache/memory footprint of each work unit. Aspects further include executing the workload on a processor by providing each work unit access to the processor for the time slice assigned to each work unit.

11 Claims, 3 Drawing Sheets

MEMORY NEST EFFICIENCY WITH CACHE DEMAND GENERATION

BACKGROUND

The present disclosure relates to the operation of a memory nest, and more specifically, to methods, systems and computer program products for optimizing the performance of a memory nest for a workload.

In general, computers, such as servers, are configured to execute data intensive workloads efficiently using available hardware resources, e.g., one or more processors and a memory nest. As used herein the term memory nest refers to the various types of storage that can be used by a processor to store data. In general, the memory nest includes a hierarchy of caches and physical memory. In general, as the level of the memory nest increases, the distance from the processor to the data increases and access latency for the processor to retrieve the data also increases.

When an instruction executing on a processor requires data and the data exists in the cache of the processor, a cache hit occurs and the processor executes the instruction. However, when the data does not exist in the cache of the processor, a cache miss occurs and is resolved using the memory nest by placing the data in the cache of the processor to execute the instruction. When a cache miss occurs, the time delay associated with retrieving the data needed increases as the level of the location of the data in the memory nest increases.

As used herein, the term workload refers to a group of work units an operating system is executing, or waiting to execute on a processor. Each work unit of the workload has an associated working set of data, which is data that is accessed by the processor during the execution of the work unit. As the processor executes a work unit, the data in the working set is brought into the processor cache from higher levels of the memory nest. The working set data settles in the memory nest such that frequent data accesses tend to be stored in lower level caches that are on or close to processor, and infrequent data accesses tend to be cached in higher level caches that are further from the processor. As a work unit executes on the processor, new data accesses push the working set of all other work units of the workload into higher levels of the memory nest. Accordingly, the longer a work unit consecutively executes on a processor, the more efficient the memory nest use becomes for the executing work unit. During execution, when the working set of the work unit changes, the process repeats such that the work unit's new working set is brought into the processor cache from the memory nest, the data access settle in the memory nest such that frequent data accesses tend to be stored in the lower level caches, the infrequent data accesses tend to be cached in higher levels of cache further from the processor, the work unit's previous working set and other work units' working set are pushed to even higher levels of the memory next. While the memory nest remains efficient for executing the current work unit, as the current work unit's working set changes, the memory nest efficiency for other work units in the workload as a whole is being further degraded because when the other work units in the workload start executing again, their working set data is at a higher level in the memory nest, so those work units experience high latency to bring the working set data into the processor cache.

SUMMARY

According to one embodiment, a method for optimizing a memory nest for a workload is provided. The method includes determining, by an operating system, the cache/memory footprint of each work unit of the workload and assigning a time slice to each work unit of the workload based on the cache/memory footprint of each work unit. The method also includes executing the workload, on a processor, by providing each work unit access to the processor for the time slice assigned to each work unit.

According to another embodiment, a computer program product for optimizing a memory nest for a workload includes a tangible storage medium readable by a processing circuit and storing instructions for execution by the processing circuit for performing a method. The method includes determining, by an operating system, the cache/memory footprint of each work unit of the workload and assigning a time slice to each work unit of the workload based on the cache/memory footprint of each work unit. The method also includes executing the workload, on a processor, by providing each work unit access to the processor for the time slice assigned to each work unit.

According to another embodiment, a computer system having a processor configured to execute a workload having one or more work units and a memory nest that includes a plurality of storage elements used to store data accessed by the processor during execution of the one or more work units is provided. The processor is configured to perform a method that includes determining, by an operating system, the cache/memory footprint of each work unit of the workload and assigning a time slice to each work unit of the workload based on the cache/memory footprint of each work unit. The method also includes executing the workload, on a processor, by providing each work unit access to the processor for the time slice assigned to each work unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, a method for optimizing a memory nest for a workload is provided. In exemplary embodiments, optimizing the memory nest for a workload includes generating working set cache demand for work units of a workload by controlling the maximum time a work unit may consecutively use the processor, referred to herein as a time slice. In exemplary embodiments, the cache/memory footprint of a work unit may be used to set the time slice for the work unit. As used herein the cache/memory footprint is the size, or amount, of unique data the work unit has recently accessed. As a work unit's cache/memory footprint increases, it becomes more likely the working set is changing over time. When the working set changes, the previous working set is no longer being accessed and only data from the current working set is being accessed. In exemplary embodiments, the processor sets the time slice for the work unit such that the length of the time slice may be inversely related to the cache/memory footprint.

Figure 1:
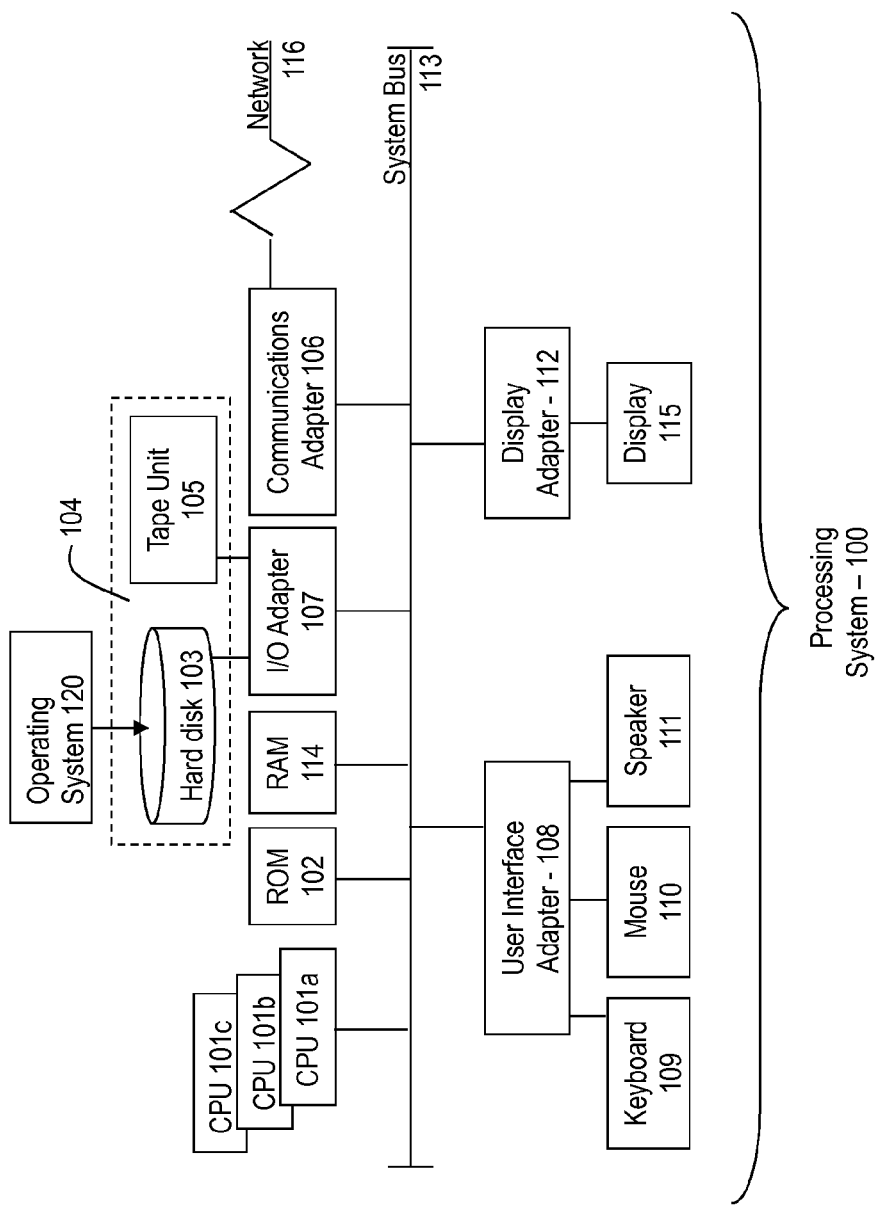
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
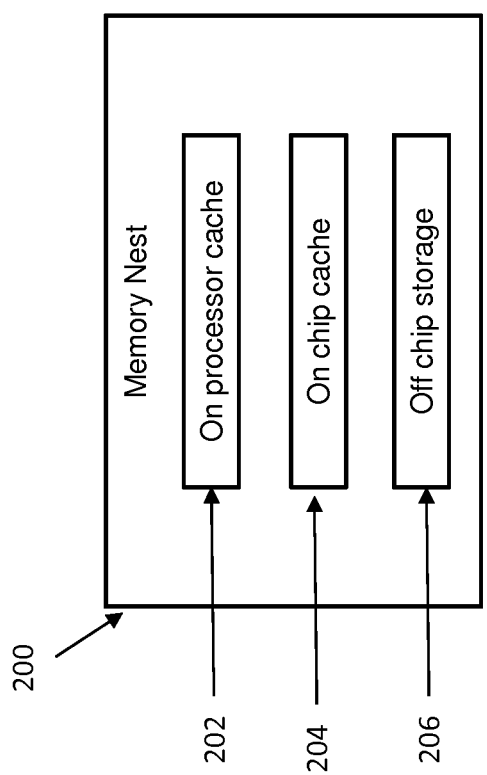
FIG. 2 a block diagram illustrating a memory nest in accordance with an exemplary embodiment.

Referring now to FIG. 2, a memory nest 200 in accordance with an exemplary embodiment is shown. The memory nest 200 includes a plurality of storage elements that are grouped into one of three storage categories. As illustrated, the memory nest 200 includes an on processor cache 202, an on chip cache 204 and off chip storage 206. It will be appreciated by those of ordinary skill in the art that each of the processor cache 202, the on chip cache 204 and the off chip storage 206 may comprise multiple storage elements that may have different access latencies. For example, the off chip storage 206 may include a high speed RAM and a hard disk. Likewise, the on chip cache 204 may include multiple caches that are located at various distances from the processor. In general, the processor cache 202 has the smallest size and lowest access latency of any memory in the memory nest 200 and the off chip storage 206 has the largest size and highest access latency of any memory in the memory nest 200. As used herein, the level of the memory nest 200 is used to refer to groups of storage elements by their access latencies. That is, the lowest level of the memory nest 200 includes the storage elements with the lowest access latency and the highest level of the memory nest 200 includes the storage elements with the highest access latency.

In exemplary embodiments, the configuration of the memory nest 200 includes a size and access latency of each of the storage elements of the memory nest 200. In exemplary embodiments when data is to be added to a particular level of the memory nest a least recently used algorithm determines which data to evict to a higher level in the memory nest.

In exemplary embodiments, for any workload, an operating system is configured to use the memory nest efficiently and to provide ready work units fast access to the processor. In order to use the memory nest efficiently, the operating system prioritizes keeping the working set of the workload in lower levels of the memory nest. In exemplary embodiments, the operating system generates cache demand for work units of a workload by controlling the time slice for each work unit of the workload. In exemplary embodiments, the operating system may set a time slice for a work unit of a workload based on one or more of a number of factors that include, but are not limited to, a number of work units in the workload, the cache/memory footprint of the work unit to be executed, and the cache/memory footprint of the remaining work units in the workload.

In exemplary embodiments, the operating system sets the time slice for the work unit such that the length of the time slice may be inversely related to the cache/memory footprint. That is, the larger the cache/memory footprint of the work unit is the shorter the time slice the work unit will be given. In exemplary embodiments, the processor may have a minimum and maximum time slice values that are used to ensure that each work unit gets sufficient access to the processor.

In general, when the operating system reduces the time slice for work units from a large time slice (e.g., 500 microseconds (μs)—or approximately 250,000 clock cycles) to a small processor time slice (e.g., 150 μs—or about 75,000 clock cycles), the operating system emphasizes providing each work unit a shorter execution duration, accessing a smaller cache/memory footprint, and receiving more frequent access to the processor. A smaller time slice results in each work unit in the workload generating more frequent cache demand for its current working set. For work units accessing a large cache/memory footprint whose working set is likely changing over time, a smaller time slice limits distance they can push away the current working set of other work units in the workload to higher levels in the memory nest and limits the number of previous working sets at lower levels of the memory nest (which will be naturally pushed away to higher levels in the memory nest by generating additional cache demand for the current working set of other work units in the workload). This design point allows the operating system to use the cache more efficiently because all work units can keep the current working set at lower levels of the memory nest which reduces the resumption cost of every work unit. As a result, the operating system continues to provide each ready work unit fast access to processor, ensures each work unit keeps its current working set near the processor, and limits how far the current working sets of other work units can be pushed away to higher levels in the memory nest.

Figure 3:
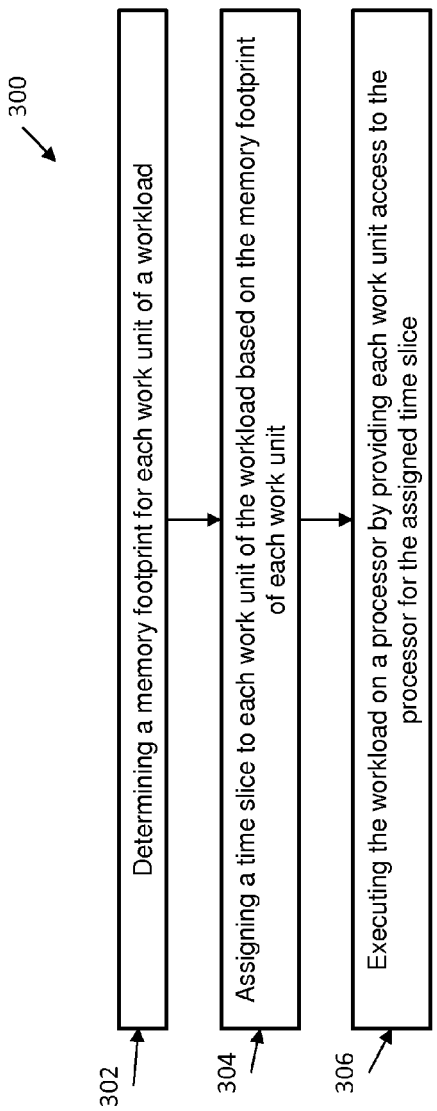
FIG. 3 illustrates a flow diagram of a method for optimizing a memory nest for a workload in accordance with an exemplary embodiment.

Referring now to FIG. 3, a flow diagram of a method 300 for optimizing a memory nest for a workload in accordance with an exemplary embodiment is shown. As shown at block 302, the method 300 includes determining a cache/memory footprint for each work unit of a workload. Next, the method 300 includes assigning a time slice to each work unit of the workload based on the cache/memory footprint of each work unit, as shown at block 304. In exemplary embodiments, the assigned time slice is greater than a minimum time slice and less than a maximum time slice. In exemplary embodiments, the assigned time slice may be inversely related to the cache/memory footprint of the work unit. Next, as shown at block 306, the method includes executing the workload on a processor by providing each work unit access to the processor for the assigned time slice.

In one embodiment, the cache/memory footprint of a working unit can be determined by a processor and stored by the operating system such that when a working unit is subsequently executed the operating system will have a priori knowledge of the cache/memory footprint for the work unit. The operating system can then use the cache/memory footprint to assign a suitable time slice to the work unit before the work unit begins executing.

In other embodiments, the operating system may determine the cache/memory footprint for a work unit based on the number of cache misses and/or the memory nest level at which those misses were resolved. As the size of the cache/memory footprint is determined to be growing larger, the operating system can reduce the time slice for the work unit. In addition, if the cache/memory footprint is determined to be smaller than expected, or than a threshold value, the operating system can increase the time slice for the work unit. In exemplary embodiments, the operating system may also adjust the time slice based on the number of work units and their cache/memory footprints. For example, for a high number of work units with a large cache/memory footprint, the operating system may make the time slice smaller for those work units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for optimizing a memory nest for a workload by an operating system, the computer program product comprising:
    a tangible storage medium readable by a processing circuit and storing instructions for execution by the processing circuit for performing a method comprising:
    determining a cache/memory footprint of each work unit of the workload;
    assigning a time slice to each work unit of the workload based on the cache/memory footprint of the work unit; and
    executing the workload, on a processor, by providing each work unit access to the processor for the time slice assigned to the work unit.

2. The computer program product of claim 1, wherein the time slice assigned to each work unit is greater than a minimum time slice and less than a maximum time slice.

3. The computer program product of claim 2, wherein the time slice assigned to each work unit is inversely related to the cache/memory footprint of the work unit.

4. The computer program product of claim 1, wherein the memory nest comprises a plurality of storage elements used to store data accessed by the processor during execution of each work unit and where each of the plurality of storage elements at a lower level in the memory nest uses a least recently used algorithm to determine what data to evict to another one of the plurality of storage elements at a higher level in the memory nest.

5. The computer program product of claim 1, wherein the cache/memory footprint of each work unit is dynamically determined during or after execution of the work unit.

6. The computer program product of claim 1, wherein the cache/memory footprint of each work unit is determined based on a number of cache misses and/or a memory nest level at which those misses were resolved.

7. A computer system having a processor configured to execute a workload having one or more work units and a memory nest that includes a plurality of storage elements used to store data accessed by the processor during execution of the one or more work units; wherein the computer system is configured to perform a method comprising:
    determining a cache/memory footprint of each work unit of the workload;
    assigning a time slice to each work unit of the workload based on the cache/memory footprint of the work unit; and
    executing the workload, on a processor, by providing each work unit access to the processor for the time slice assigned to the work unit.

8. The computer system of claim 7, wherein the time slice assigned to each work unit is greater than a minimum time slice and less than a maximum time slice.

9. The computer system of claim 8, wherein the time slice assigned to each work unit is inversely related to the cache/memory footprint of the work unit.

10. The computer system of claim 7, wherein the cache/memory footprint of each work unit is determined during or after the execution of the work unit.

11. The computer system of claim 7, wherein the cache/memory footprint of each work unit is determined based on a number of cache misses and/or a memory nest level at which those cache misses were resolved.

* * * * *